(12) United States Patent
Ogg

(10) Patent No.: US 8,883,345 B2
(45) Date of Patent: Nov. 11, 2014

(54) PRISMATIC BATTERY

(75) Inventor: Randy Ogg, Newberry, FL (US)

(73) Assignee: Encell Technology LLC, Alachua, FL (US)

( * ) Notice: Subject to any disclaimer, the term of this patent is extended or adjusted under 35 U.S.C. 154(b) by 865 days.

(21) Appl. No.: 12/342,542

(22) Filed: Dec. 23, 2008

(65) Prior Publication Data

US 2009/0173582 A1    Jul. 9, 2009

Related U.S. Application Data

(60) Provisional application No. 61/006,182, filed on Dec. 28, 2007, provisional application No. 61/100,318, filed on Sep. 26, 2008.

(51) Int. Cl.
| | | |
|---|---|---|
| H01M 4/02 | (2006.01) | |
| H01M 4/04 | (2006.01) | |
| H01M 4/134 | (2010.01) | |
| H01M 4/50 | (2010.01) | |
| H01M 10/28 | (2006.01) | |
| H01M 2/30 | (2006.01) | |
| H01M 4/70 | (2006.01) | |
| H01M 10/04 | (2006.01) | |
| H02J 9/06 | (2006.01) | |
| H02J 7/35 | (2006.01) | |

(52) U.S. Cl.
CPC ............ *H01M 10/04* (2013.01); *H01M 10/281* (2013.01); *H01M 2/305* (2013.01); *H01M 2/30* (2013.01); *Y02B 10/72* (2013.01); *Y02E 60/124* (2013.01); *H02J 7/35* (2013.01); *H01M 4/70* (2013.01); *H02J 9/06* (2013.01)

USPC ........... 429/209; 429/178; 429/211; 429/224; 429/229; 429/236; 429/241; 429/242; 29/623.1; 29/623.5

(58) Field of Classification Search
None
See application file for complete search history.

(56) References Cited

U.S. PATENT DOCUMENTS

| | | |
|---|---|---|
| 5,424,145 A | 6/1995 | Tomantschger et al. |
| 5,456,813 A | 10/1995 | Grange-Cossou et al. |
| 5,626,988 A | 5/1997 | Daniel-Ivad et al. |
| 5,773,164 A | 6/1998 | Venkatesan et al. |
| 6,245,457 B1 | 6/2001 | Romero |
| 6,312,848 B1 | 11/2001 | Kilb et al. |
| 6,361,899 B1 | 3/2002 | Daniel-Ivad et al. |
| 6,425,461 B1 | 7/2002 | Wang |
| 6,841,296 B2 | 1/2005 | Ng et al. |

(Continued)

FOREIGN PATENT DOCUMENTS

CA    2389907 A1    12/2003

OTHER PUBLICATIONS

International Search Report dated May 14, 2009 (Four (4) pages).

(Continued)

*Primary Examiner* — Kwang Han
(74) *Attorney, Agent, or Firm* — Merchant & Gould

(57) ABSTRACT

Provided is a prismatic battery comprising stacked positive electrode plates, negative electrode plates and separator layers therebetween. The positive and negative electrode plates extend beyond a periphery of the electrode stack. The positive electrode plates are fused to form a positive current collector, and the negative electrode plates are fused to form a negative current collector. Both the positive and negative electrode plates comprise a metal foam and are compressed between about 42 and 45% of the original thickness.

23 Claims, 12 Drawing Sheets

(56) References Cited

U.S. PATENT DOCUMENTS

| | | |
|---|---|---|
| 6,966,409 B2 | 11/2005 | Wang |
| 7,275,622 B2 | 10/2007 | Hall et al. |
| 7,279,250 B2 | 10/2007 | Berkowitz et al. |
| 7,285,355 B2 | 10/2007 | Ruth et al. |
| 2001/0031395 A1* | 10/2001 | Fukuda et al. ............ 429/211 |
| 2002/0197530 A1* | 12/2002 | Tani et al. ............ 429/218.2 |
| 2003/0068549 A1 | 4/2003 | Daniel-Ivad et al. |
| 2004/0038090 A1* | 2/2004 | Faris ............................ 429/12 |
| 2004/0185332 A1 | 9/2004 | Botos |
| 2005/0051388 A1 | 3/2005 | Wang |
| 2005/0164076 A1 | 7/2005 | Daniel-Ivad |
| 2006/0124894 A1 | 6/2006 | Daniel-Ivad et al. |
| 2007/0056806 A1 | 3/2007 | Okamoto et al. |
| 2007/0092792 A1* | 4/2007 | Kasahara et al. ............ 429/161 |
| 2007/0122704 A1 | 5/2007 | Daniel-Ivad et al. |
| 2008/0073157 A1 | 3/2008 | Kanon et al. |

OTHER PUBLICATIONS

Andreas Stani et al., "Development of Flat Plate Rechargeable Alkaline Manganese Dioxide-Zinc Cells," *Journal of Power Sources* 153: 405-412 (2006).

P. R. Roberge et al., "Electrochemical Characterization of Flat-Plate Rechargeable Alkaline Manganese Dioxide-Zinc Cells," *Journal of Power Sources* 47:13-26 (1994).

\* cited by examiner

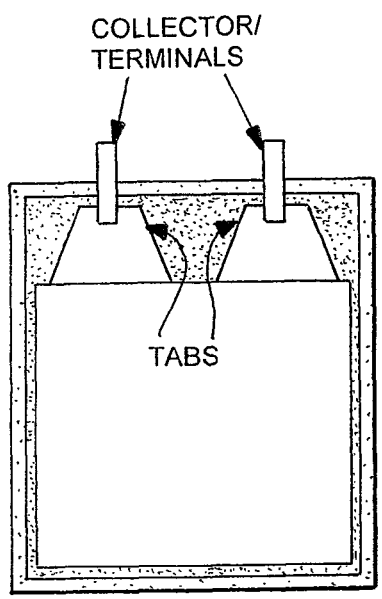 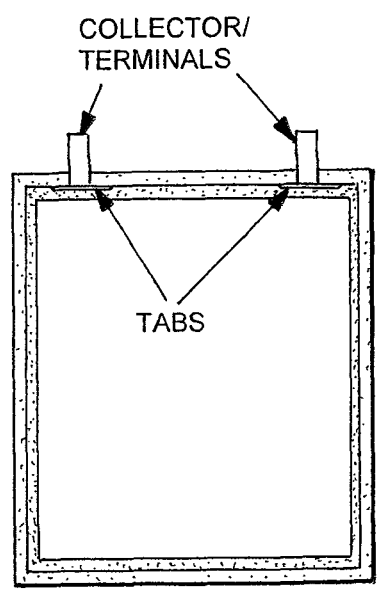
FIGURE 6a
PRIOR ART
FIGURE 6b
PRIOR ART

PRISMATIC BATTERY

RELATED APPLICATIONS

This application claims priority to U.S. Provisional Application No. 61/006,182, filed Dec. 28, 2007, entitled "Prismatic Battery Utilizing Continuous Bus Bar Collectors Between Electrodes", and U.S. Provisional Application No. 61/100,318, filed Sep. 26, 2008, entitled "Rechargeable ZnMn Flat Plate Electrode Cell", the disclosures of which are hereby incorporated by reference in their entireties.

BACKGROUND

Elevator systems exist that, in the event of a power system failure, move an elevator car or allow the elevator car to be moved to the next lower floor. A backup power supply system often moves the elevator car to the next lower floor very slowly, or gravity is used to allow the elevator car to move down to the next floor. When the elevator car arrives at the next lower floor the elevator car doors are then opened using the backup power supply system, or the doors may be pried open.

A problem with conventional battery backup systems is that the battery loses power overtime and may not have enough power to move the elevator car to a floor and open the door to allow the passengers to get off of the elevator car safely. As such, the battery must be routinely checked to ensure sufficient battery power, and replaced in the event there is insufficient power. Since batteries may discharge at different rates depending on factors including heat, age, and usage, determining the frequency of battery checks is difficult.

Another problem with conventional elevator backup systems is that due to the size requirements, and resultant weight of the battery or generator which is to provide the necessary power to backup the elevator system, the backup battery or generator must be kept separate from the elevator, and in particular at the bottom of the elevator shaft, for example, in the basement of the building housing the elevator. However, severe storms, for example, hurricanes, that can cause elevator power system failures, may be accompanied by heavy rain that may result in building flooding, which would render the battery backup or generator stored in the basement of the building unusable. Further, a flooded area containing a submerged or partially submerged backup battery or generator may result in dangerous conditions, as chemicals within the battery or generator may leach or leak out into the floodwater.

What is needed are new elevator backup systems, for example, in the form of a rechargeable battery, that avoid the problems outlined above. An elevator backup system in the form of a rechargeable battery that avoids the problems outlined above must overcome problems of conventional rechargeable batteries, which move current from an active material to an external terminal through effectively parallel paths. In general, current is collected from one side of an electrode, often through a single tab. Thus, a current restriction is created at the tab connection where the current paths merge. The created current restriction creates resistance that increases with the size of the electrode. Thus, there exists a minimum limitation on the size of batteries for a given performance (power, efficiency, etc.).

While ZnMn chemistries for batteries are low cost and lightweight, are environmentally benign, and have a very long charge retention, currently, the only batteries (rechargeable or non-rechargeable) commercially available with ZnMn chemistries are round bobbin cells. Round bobbin cells have a positive electrode that is stamped or pressed into a cylindrical hollow pellet and seated into a can, and the negative electrode is a gel that is filled into the center void of the positive electrode.

The high internal resistance of low capacity round bobbin cells limits the currents (i.e., power) that they can deliver. In contrast, flat plate (electrode) cells can be scaled up to large sizes providing high currents and storage capacities.

CA 2 389 907 A1 relates to a method of producing flat plate electrodes in a small format that exhibit high current densities, higher utilization of the active materials, and better rechargeability. The method of forming the electrodes requires the active materials, binders, thickening agents, additives, and an alkaline electrolyte to form a paste that is applied to a current collector. CA 2 389 907 A1 provides is a flat plate rechargeable alkaline manganese dioxide-zinc cell.

An elevator backup system in the form of a rechargeable battery that avoids the problems outlined above should exhibit improvements in, for example, current density, memory effect (i.e., capacity fade), shelf life, charge retention (e.g., at higher operation temperatures), and voltage level of discharge curve over known round bobbin and flat plate cells.

SUMMARY

Provided is a method of controlling an elevator system. The method comprises transferring power to an elevator car from a primary power supply to a backup power supply without interruption of power if the primary power supply fails or is disrupted. Following transfer of power to the elevator car from the primary power supply to the backup power supply either pending operations of the elevator car are completed or the elevator car is moved to a predetermined floor based on pending operations of the elevator car.

Also provided is an elevator system comprising an elevator car; a primary power supply; and a backup power supply attached to the elevator car.

Further provided is a prismatic battery comprising an electrode stack comprised of positive electrode plates, negative electrode plates, and separator layers therebetween. The positive electrode plates comprise positive electrode plate extensions that extend beyond a periphery of the electrode stack, and the positive electrode plates are arranged such that the positive electrode plate extensions are aligned with one another. The negative electrode plates comprise negative electrode plate extensions that extend beyond a periphery of the electrode stack, and the negative electrode plates are arranged such that the negative electrode plate extensions are aligned with one another. The prismatic battery further comprises positive current collectors formed by fusing the positive electrode plate extensions and negative current collectors formed by fusing the negative electrode plate extensions.

Additionally provided is a flat plate electrode cell comprising positive electrode plates each comprising manganese and compressed metal foam and negative electrode plates each comprising zinc and compressed metal foam.

Accordingly, moreover provided is a rechargeable prismatic battery comprising an electrode stack comprised of positive electrode plates and negative electrode plates. The positive electrode plates each comprise manganese, compressed metal foam, and positive electrode plate extensions that extend beyond a periphery of the electrode stack, and the positive electrode plates are arranged such that the positive electrode plate extensions are aligned with one another. The negative electrode plates each comprise zinc, compressed metal foam, and negative electrode plate extensions that extend beyond a periphery of the electrode stack, and the negative electrode plates are arranged such that the negative electrode plate extensions are aligned with one another. The prismatic battery further comprises positive current collectors formed by fusing the positive electrode plate extensions and negative current collectors formed by fusing the negative electrode plate extensions.

The rechargeable prismatic battery of the present disclosure provides improvements in, for example, current density, memory effect (i.e., capacity fade), shelf life, charge retention (e.g., at higher operation temperatures), and voltage level of discharge curve over known round bobbin and flat plate cells. In particular, the rechargeable flat plate electrode cell of the present disclosure provides longer cycle life with reduced capacity fade as compared with known round bobbin and flat plate cells.

The rechargeable prismatic battery of the present disclosure achieves such benefits through unique electrode formation and electrode arrangement. In particular, both the positive and negative electrode of the rechargeable flat plate electrode cell of the present disclosure are formed from compressed metal foam, which provides both low resistance and high rate performance to the electrodes and the cell. Additionally, the rechargeable prismatic battery of the present disclosure moves current from the active material to an external terminal through multiple directions in a manner that is efficient in cost, volume, and weight and current via extensions from electrode plates at multiple (e.g., two, three, four, five, six, seven, eight, etc.) locations along a periphery of an electrode stack.

BRIEF DESCRIPTION OF THE FIGURES OF THE DRAWING

FIG. 6a depicts the space required in a battery for conventional connection of individual electrode tabs to collectors, while FIG. 6b depicts the space required in a battery for a continuous strip or bus bar formed by fusing electrode plate extensions, as described herein.

DETAILED DESCRIPTION

Figure 1:
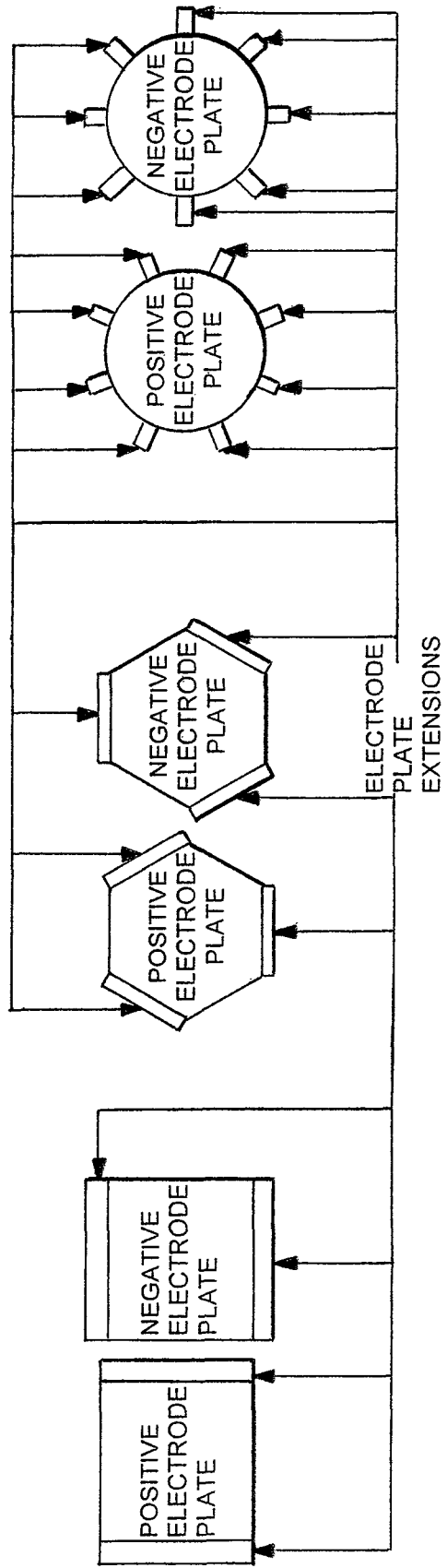
FIG. 1 depicts electrode plate extensions on multiple sides of electrode plate stacks, as described herein.

The present method of controlling an elevator system comprises transferring power to an elevator car from a primary power supply to a backup power supply without interruption of power if the primary power supply fails or is disrupted. Following transfer of power to the elevator car from the primary power supply to the backup power supply either pending operations of the elevator car are completed or the elevator car is moved to a predetermined floor based on pending operations of the elevator car.

As used herein, the phrase "pending operations" refers to floor stops requested by one or more elevator riders prior to primary power supply failing or being disrupted. Thus, completing pending operations would include moving the elevator car to a requested floor and opening one or more elevator car doors. In contrast to elevator systems that, in the event of a power system failure, move an elevator car or allow the elevator car to be moved to the next lower floor, passengers in elevators equipped with the elevator backup system of the present disclosure may not be aware of the power outage until the elevator car opens its doors at the requested floor stop, after which the elevator system may shut down.

Alternatively, the elevator controller may be programmed such that in the event the pending operations include one or more floor stop requests that may be undesirable in the condition of a power outage (e.g., a below-ground level without emergency lighting), rather than completing the pending operation(s), the elevator car may be moved to a predetermined floor (e.g., a ground floor level). The primary power supply can comprise AC power, while the backup power supply can comprise DC power.

The present elevator system comprises an elevator car, a primary power supply, and a backup power supply attached to the elevator car. For example, the backup power supply can be located on top of the elevator car. By attaching the backup power supply to the elevator car, problems associated with a battery backup or generator stored, for example, at the bottom of the elevator shaft can be avoided. However, a backup power supply attached to an elevator car must overcome size and resultant weight requirements of known backup systems. The primary power supply can comprise AC power, while the backup power supply can comprise DC power.

As the backup power supply is attached to the elevator car, the operability of the elevator may be maintained, despite the primary power outage. Depending on the power and/or capacity of the backup power supply attached to the elevator car, the elevator may be operated in its regular course, or may be operated in a "power save" mode, for example, with reduced lighting. The elevator system can further comprise solar recharging capabilities for the backup power supply.

In an embodiment, the backup power supply comprises a rechargeable prismatic battery comprising an electrode stack comprised of positive electrode plates and negative electrode plates. The positive electrode plates each comprise manganese, compressed metal foam, and positive electrode plate extensions that extend beyond a periphery of the electrode stack, and the positive electrode plates are arranged such that the positive electrode plate extensions are aligned with one another. The negative electrode plates each comprise zinc, compressed metal foam, and negative electrode plate extensions that extend beyond a periphery of the electrode stack, and the negative electrode plates are arranged such that the negative electrode plate extensions are aligned with one another. The prismatic battery further comprises positive current collectors formed by fusing the positive electrode plate extensions and negative current collectors formed by fusing the negative electrode plate extensions.

The rechargeable prismatic battery of the present disclosure reduces the material costs, weight, toxicity (regulated limitations), volume, and maintenance of known batteries, while increasing charge retention and reliability. The rechargeable prismatic battery of the present disclosure comprises one or more anode plates comprising anode paste and one or more cathode plates comprising cathode paste. The anode and cathode pastes each comprises active material metal powders (e.g., zinc and manganese, respectively) mixed with aqueous or organic binder to create a paste that can be consistently coated on one or both sides of a substrate. The substrate holds the active material (i.e., the paste) and acts as a current collector. In an embodiment, the substrate is made of a conductive material such as steel, Ni, or Cu, and may be plated with indium or Ni (i.e., a material that is non-active relative to $MnO_2$) for the cathode and Cu (i.e., a non-active material relative to zinc) for the anode. In an embodiment, the substrate comprises a porous conductive substrate such as, for example, perforated metal, metal foam, metal felt, expanded metal, or carbon foam. More specifically, the substrate comprises nickel foam and/or copper plated nickel foam. Accordingly, the anode or cathode paste is coated on and throughout the foam mesh.

The coated substrate is dried and sized (i.e., compressed) to create a highly conductive, dense, porous flat plate electrode. The flat plate electrodes can be wrapped and sealed in a layer of barrier and separator material to prevent short circuits and dendrite growth, or separator layers between the electrodes can be used. The (wrapped and sealed) flat plate electrodes are stacked in an alternating cathode and anode pattern that is repeated until a desired capacity of the cell is reached. Electrode plate extensions, as further described below, of the flat plate cathode electrodes are connected together and electrode plate extensions, as further described below, of the flat plate anode electrodes are connected together. In an embodiment, the rechargeable flat plate electrode cell of the present disclosure is bi-polar. Such bipolar batteries use a substrate to hold the positive active materials on one side and negative active materials on the other and the substrate acts as a cell wall. The cell walls are sealed either peripherally or tangentially to hold internal pressure and electrolyte.

In metal foams, typically 75-95% of the volume consists of void spaces. As such, the use of metal foams allows for thicker electrode substrates without increasing the resistance of the electrode substrates. Target compression from sizing for this embodiment is between about 42% and 45%, which gives desirable porosity, required for low resistance/high rate performance of the rechargeable flat plate electrode cell.

Without wishing to be bound by any theories, it is believed that the high density of compression reduces the resistance within the paste by reducing the distance between active particles in the active material and reduces the resistance to the substrate by bringing the active particles closer to it. The high density reduces the volume so the energy density is increased. The high density also reduces the void volume in the active material which reduces the amount of electrolyte required to fill the electrode which in turn reduces the rate at which dendrites are formed which protects the cell from shorting and increases cycle life. The density level is critical since over-compression will cause dry spots in the active material where electrolyte cannot get to. These dry spots are very high resistance which reduces performance and can create gassing areas which cause cell failure.

Without sizing, desired energy density and high power capability are not achieved. The target coated sized thickness for the cathode is less than about 0.0300 inches. Coated sized thickness for the cathode greater than about 0.0300 inches results in rate capability (power) losses, while coated sized thickness for the cathode less than about 0.0200 inches results in energy density losses, due to excess inter electrode spacing and substrate relative to active material.

The anode paste comprises about 75-98 weight %, for example, about 83.1 weight %, zinc active material; about 0.01-1.0 weight %, for example, about 0.27 weight %, polymeric binder; and about 0-20 weight %, for example, about 16.6 weight %, solid zinc oxide. Exemplary zinc active materials include lead-free zinc and zinc alloy, such as, for example, in metallic, powder, granular, particulate, fibrous, or flake form.

The cathode paste comprises about 70-90 weight % electrolytic manganese dioxide; about 2-15 weight %, for example, about 7.5 weight %, graphite and/or carbon black; about 3-10 weight %, for example, about 6 weight %, polymeric binder; about 1-15 weight %, for example, about 5 weight %, barium compound; and about 0.01-10 weight %, for example, about 5 weight %, hydrogen recombination catalyst. Exemplary barium compounds include barium oxide, barium hydroxide, and barium sulfate. Exemplary hydrogen recombination catalysts include silver, silver oxides, and hydrogen absorbing alloys. The cathode paste may further comprise indium.

Exemplary polymeric binders of either the cathode paste or anode paste include carboxymethyl cellulose (CMC), polyacrylic acid, starch, starch derivatives, polyisobutylene, polytetrafluoroethylene, polyamide, polyethylene, and a metal stearate. The polymeric binder of either the cathode paste or anode paste can include conductive graphite, for example, conductive graphite having an average particle size between 2 and 6 microns.

The rechargeable prismatic battery of the present disclosure differs from currently commercially available rechargeable ZnMn batteries in that the flat plate electrodes of the cell:
 are flat;
 have an internal carrier (substrate);
 have a current collector attached to the internal carrier; and
 have the anode's active material completely sealed in a barrier to stop dendrite failures.

The rechargeable prismatic battery of the present disclosure further differs from currently commercially available batteries in that:
 flat plate cathode electrodes are produced by use of aqueous or organic binder and metal powder which is coated, dried and sized, instead of a glycol gel that is injected into a barrier wrapped pocket, which allows for the production of high volume flat plate electrodes required for economical power backup batteries;
 flat plate anode electrodes are produced by use of an aqueous or organic binder and metal powder which is coated, dried, and sized, instead of mixing and then high pressure stamp forming into a ridged pellet, which allows for the production of high volume flat plate electrodes required for economical power backup batteries;
 multiple flat plate cathode electrodes and flat plate anode electrodes can be connected in parallel then placed in a container, filled with electrolyte, and then sealed, instead of a cathode pellet wedged into a metal can, a barrier separator inserted into the cathode pellet cavity, and then anode gel injected into the cavity with a metal pin inserted into the center of the gel, and closed using a seal ring and crimping, which allows for the high capacity required for stationary power backup batteries.

Advantages of the rechargeable prismatic battery of the present disclosure include:
 reducing battery cost through lower material costs, lower production costs, and using fewer components;

reducing battery weight through higher energy dense chemistry, and using fewer components;

reducing battery volume through higher energy dense chemistry, and using fewer components;

reducing environmental and regulated (storage, disposal, shipping) issues by using environmentally friendly chemistry;

improving reliability by using batteries with higher capacities and internal series collectors so fewer batteries/connections are used;

reducing continuous energy losses by using a chemistry with higher charge retention; and reduces energy losses in the system by improving performance (charge efficiency, rate capability) through battery design that reduces losses from internal resistance in the battery.

The rechargeable prismatic battery of the present disclosure also differs from currently commercially available rechargeable ZnMn batteries in that current is drawn from the flat plate electrodes of the cell in multiple (e.g., opposite) directions, thus reducing:

magnetic signature during use;

resistance and increasing the rate capability of the cell, allowing ZnMn chemistry to function at a much higher rate such that it is practical for use as power backup;

voltage gradient across the flat plate electrode, which reduces the irreversible reactions that take place on high rate charge/discharge as well as at end of charge and end of discharge, which increases the cycle life of the battery such that it is practical for use as power backup.

The rechargeable prismatic battery of the present disclosure reduce the correlation between battery size and power/efficiency, so that batteries can be made any size without a meaningful drop in performance, and reduce resistance in batteries, specifically reduce the delta (i.e., the difference) between the highest and lowest resistance areas of battery electrodes. A high delta between resistance areas causes active materials in areas of high and low resistance to be pushed into overcharge or reversal on charge or discharge which causes degradation of the battery (e.g., gassing, high pressure, breakdown of the separator/binder, loss of active material, competing side reactions, etc.).

Figure 2:
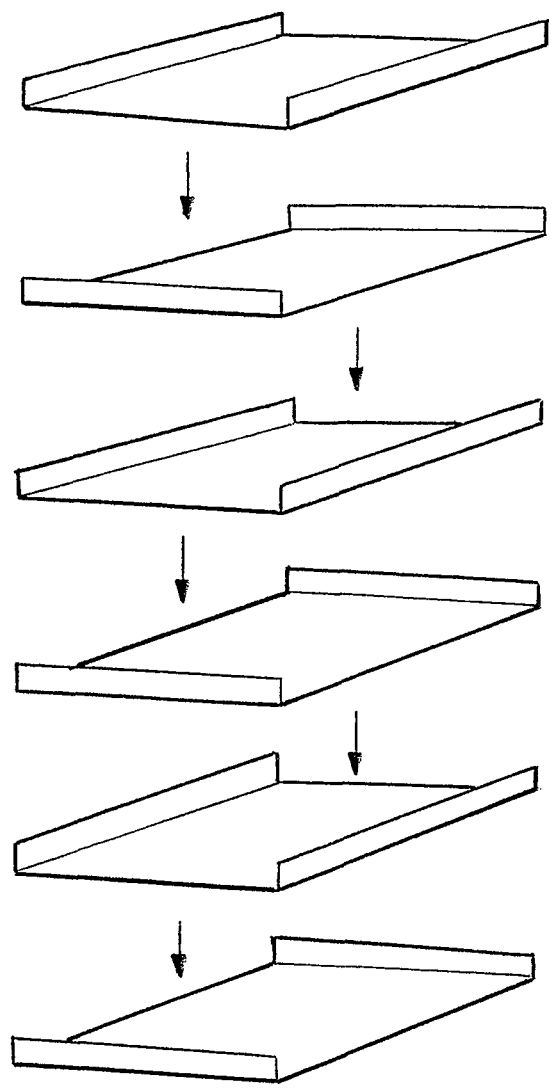
FIG. 2 depicts the assembly of positive electrode plates and negative electrode plates.

In particular, FIG. 1 illustrates electrode plates in accordance with the rechargeable prismatic battery of the present disclosure. As illustrated in FIG. 1a, both positive electrode plates and negative electrode plates used to form an electrode stack can have four sides. The positive electrode plates can have positive electrode plate extensions on opposing sides, while the negative electrode plates can have negative electrode plate extensions on complementary opposing sides. While FIG. 1 illustrates the electrode plate extensions in a flat form, prior to assembly of the electrode stack, the electrode plate extensions can be bent, as illustrated in FIG. 2. While not shown in FIG. 2, in the electrode stack, the alternating positive and negative electrode plates are separated by separator layers, which insulate the electrode plates from one another.

Thus, as used herein, the phrase "electrode plate extensions" refers to segments of the individual electrode plates which extend beyond the area of an electrode stack that includes layers of positive electrode plates, negative electrode plates, and separator layers therebetween. Again, during assembly of the electrode stack, the electrode plate extensions can be bent in a form to be discussed further below. Similarly, as used herein, the phrase "electrode extensions" refers to the cumulative positive and/or negative electrode plate extensions of the electrode stack.

As illustrated in FIG. 1b, both positive electrode plates and negative electrode plates used to form an electrode stack can have six sides. The positive electrode plates can have, for example, three positive electrode plate extensions on alternating sides, while the negative electrode plates can have, for example, three negative electrode plate extensions on complementary alternating sides. Thus, for an electrode stack whose periphery has a finite number of sides (i.e., not a cylindrical electrode stack), the multiple locations along the periphery of the electrode stack can correspond to the sides of the electrode stack. In particular, for an electrode stack whose periphery has an even number of sides, the positive or negative electrode extensions can be present on alternating sides of the electrode stack and/or half of the sides of the electrode stack. Alternatively, for a cylindrical electrode stack, the multiple locations along the periphery (i.e., circumference) of the electrode stack at which electrode extensions are present can be referred to as "sides" of the electrode stack (see FIG. 1c).

Figure 3:
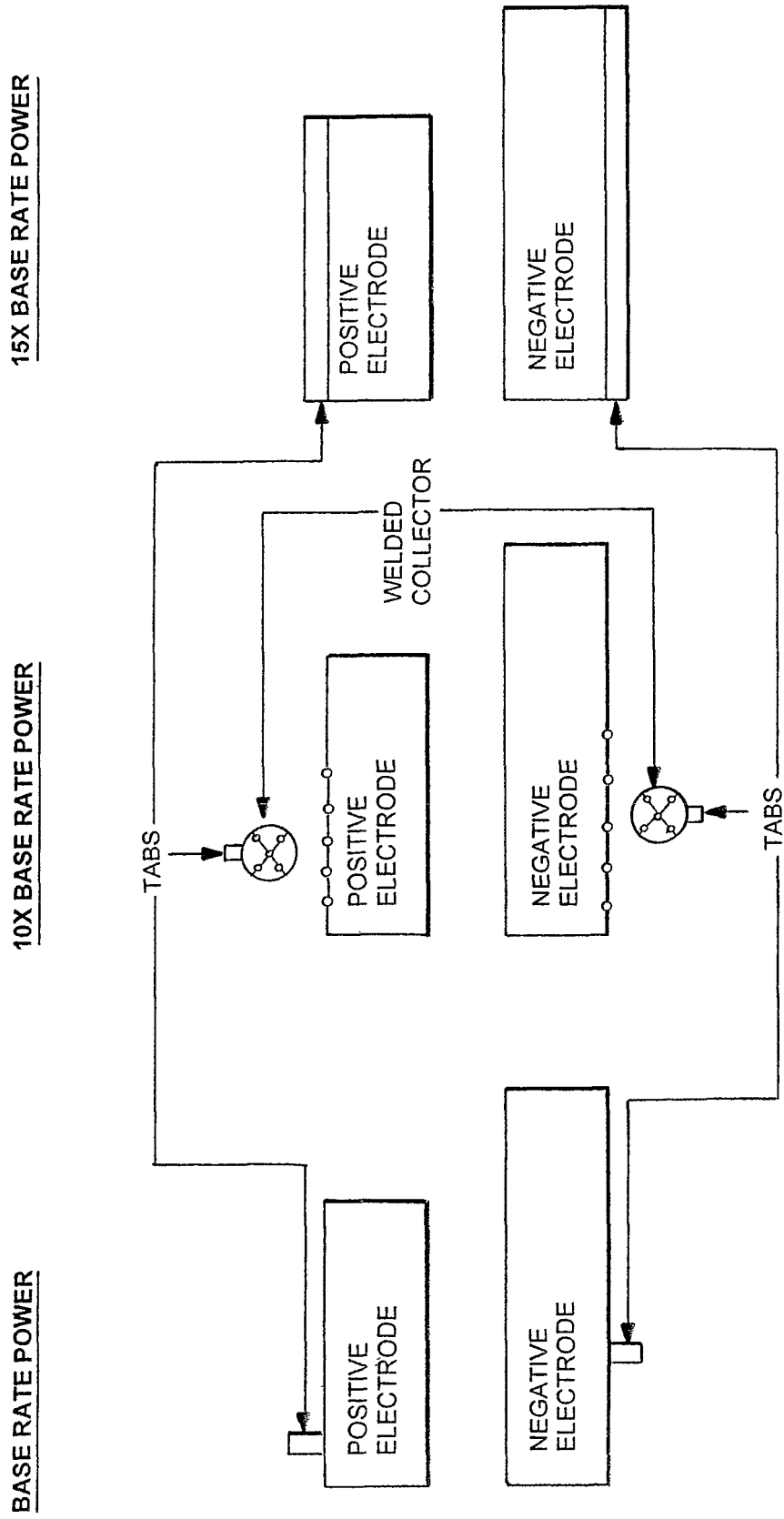
FIG. 3 depicts effect of various tabs on rate or power capability of a battery.

Restriction at conventional tabs is reduced by adding more and/or larger tabs. With regard to the size of the tabs, as tab area increases, the rate or power capability of the battery increases. Thus, FIG. 3 illustrates that a welded collector of a wound battery (i.e., a collector providing multiple point of connection between an electrode and a tab) could provide 10 times a "Base Rate Power" (i.e., the power of a standard battery having a single tab attached to an electrode), while a tab that is coextensive with a side of an electrode could provide 15 times the "Base Rate Power". In comparison, the electrode extensions of the rechargeable prismatic battery of the present disclosure (see, for example, FIG. 1; not shown in FIG. 3) could provide 20 times to 30 times the "Base Rate Power".

Figure 4:
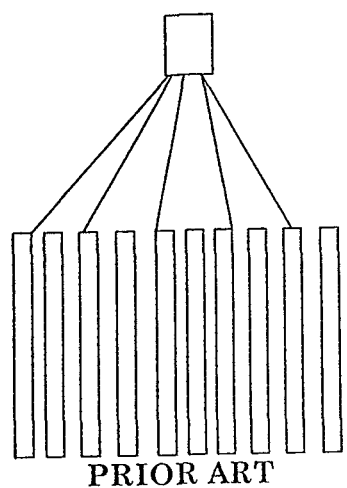
FIG. 4 depicts conventional connection of electrode tabs to collectors individually.
Figure 5:
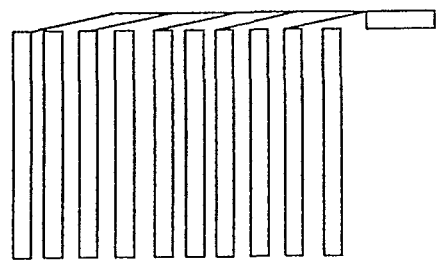
FIG. 5 depicts fusing of electrode plate extensions into a continuous strip or bus bar, as described herein.
Figure 7:
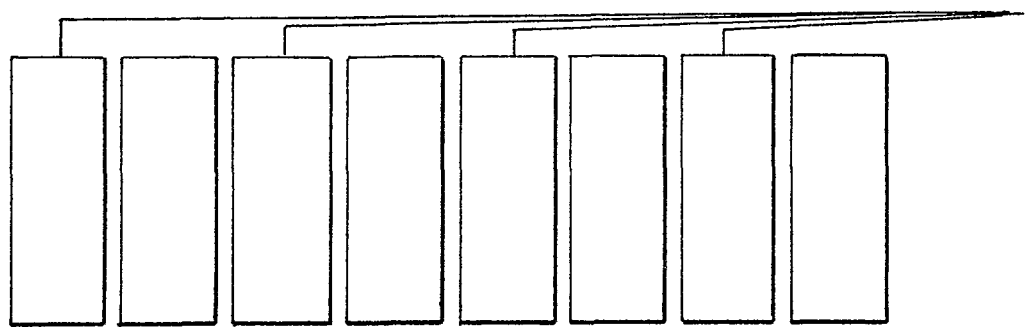
FIG. 7 depicts nesting and overlapping of adjacent electrode plate extensions, as described herein.

As illustrated in FIG. 4 and FIG. 6a, conventional connection of individual tabs to collectors can take up 5-30 volume % of most batteries and is the main resistance point, because the tabs extend from individual electrode plates in substantially the same plane as the electrode plates and then must be gathered for connection to collectors. In contrast, as illustrated in FIG. 5 and FIG. 7, bent electrode plate extensions of the rechargeable prismatic battery of the present disclosure readily cooperate and nest with adjacent electrode plate extensions such that overlapping electrode plate extensions can be readily fused together to form a continuous strip or bus bar so that as the battery grows in size (e.g., capacity or number of electrode plates) the bus bar (i.e., current collector) automatically grows with it. Stated otherwise, electrode plates are connected via electrode plate extensions to form a continuous bus bar. The rechargeable prismatic battery of the present disclosure thus eliminates the need for individual tabs on electrode plates (which would either be coupled together for connection to a terminal or individually connected to a current collector) and fuses the individual electrode plates in a continuous bus bar. Positive current collectors can then be connected to each other and to a terminal, and negative current collectors can then be connected to each other and to a terminal. Thus, as illustrated in FIG. 6b, the rechargeable prismatic battery of the present disclosure minimizes the amount of battery volume required for connection of electrode plates to terminals.

As the rechargeable prismatic battery of the present disclosure essentially replaces a conventional single tab with continuous bus bars on multiple sides of an electrode stack, the rechargeable prismatic battery of the present disclosure reduces the distance current has to travel through electrode plates. For example, with a conventional single tab, the longest distance that current would have to travel through electrode plates would be the length of the electrode plates. In contrast, with the continuous bus bars on multiple sides of an electrode stack of the rechargeable prismatic battery of the present disclosure, the longest distance that current would have to travel through electrode plates would be one half the length of the electrode plates (i.e., assuming an electrode stack with four sides, two positive electrode plate extensions on opposing sides, and two negative electrode plate extensions on complementary opposing sides; more sides on the electrode stack and correspondingly more electrode plate extensions would further reduce the distance that current would have to travel through electrode plates). The cumulative effect on the battery is to reduce the total resistance of the battery, which improves performance (e.g., rate) and reduces the delta between the high and low resistance areas on the electrode while spreading them out so that degradation of battery performance is reduced. Thus, costs, weight, and volume are reduced while increasing performance.

Figure 8:
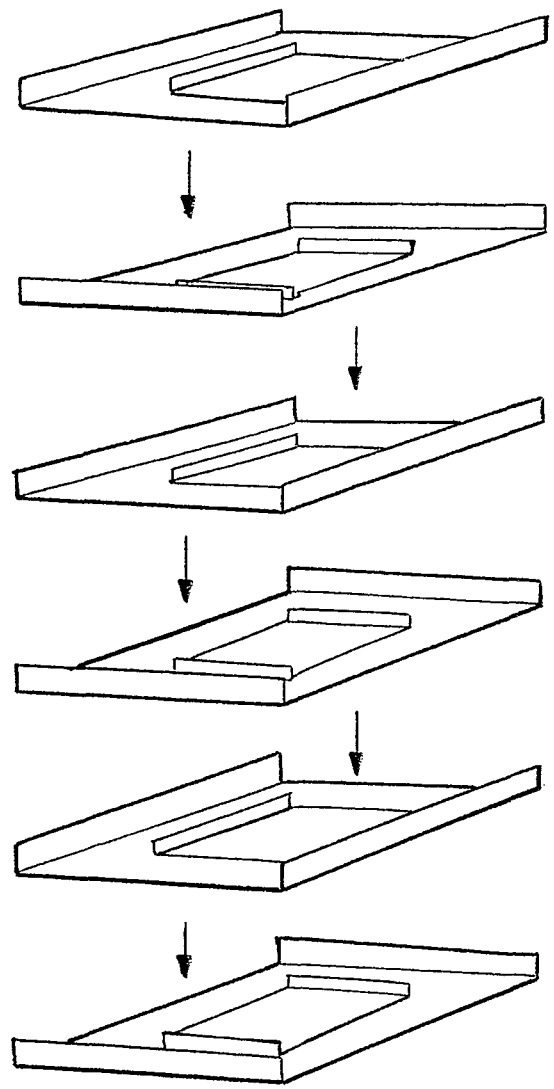
FIG. 8 depicts the assembly of positive electrode plates and negative electrode plates, according to an embodiment.

In order to further reduce the distance current has to travel through electrode plates, one or more sections of the electrode plates can be "punched out", with electrode plate extensions present in such punched out sections of the electrode plates, as illustrated in FIG. 8. The benefit of including such "internal" electrode plate extensions (i.e., reducing the distance current has to travel through electrode plates), should be weighed against the loss of electrode plate area, which result from punching out the one or more sections from the electrode plates.

The spacing between electrode plates in conventional batteries is maintained by axial pressure on the electrode plates and the resistance to that pressure by the separator(s). The spacing between the electrode plates is critical for chemical transfer and directly effects performance and efficiency. In an embodiment, the rechargeable prismatic battery of the present disclosure locks the spacing between the electrode plates as the continuous bus bar is formed. For example, the substrate or electrode plate extensions can be exposed the length of 3.25 cell stacks and bent at an 85° angle, for both positive and negative electrode plates. The length of 3.25 cell stacks insures that at least 3 layers of metal (substrate or electrode plate extensions) are on the outside of the active cell (positive active material, separator, negative active material). As these layers are stacked (positive electrode, separator, negative electrode, separator, then repeated as many times as defined for capacity of the cell) the exposed bent length of substrate will nest with the same electrode above it. The 85° angle is functional for good nesting when the electrode thicknesses are about 0.030 inches and the substrates are 0.003 inches thick. If these two thicknesses change the ideal angle would change. The electrode stack is compressed to the target spacing between the electrode plates, then the bent electrode plate extensions are fused into a continuous bus bar. The bent electrode plate extensions can be fused into the continuous bus bar by, for example, resistance welding or metalized spraying.

The length of the electrode plate extensions, and resultantly, the amount of overlap of nesting electrode plate extensions can depend on the method used to fuse the bent electrode plate extensions into the continuous bus bar. For example, metalized spraying might fuse, for example, two layers of electrode plate extensions. Thus, a length of electrode plate extensions that provides three overlapping layers of electrode plate extensions will allow for creation of a continuous bus bar by fusing the top two layers, while the third layer can protect the electrode stack from the metalized spraying during the fusing process. Resistance or Laser welding likewise could be used to fuse the outside two layers while the third inside layer would act as a buffer protecting the active material and separator from heat, sparks, or other debris which could cause damage (such as a short circuit) to the cell stack.

As the current collectors run along the side of the electrode stack, the separator layers can comprise a wrapping of electrode plates to protect and insulate the edges of electrode plates from the current collectors. In an embodiment, electrode plates are wrapped with separator layer material such that only electrode plate extensions of the electrode plates are exposed.

Further advantages of the rechargeable prismatic battery of the present disclosure include improved manufacturability. As all positive electrode plates are interchangeable (i.e., positive electrode plate extensions do not differ between different positive electrode plates in an electrode stack) and all negative electrode plates are interchangeable (i.e., negative electrode plate extensions do not differ between different negative electrode plates in an electrode stack), the method of assembly of the rechargeable prismatic battery of the present disclosure simply includes stacking alternating layers of positive electrode plates and negative electrode plates, with separator layers in between, while arranging the positive electrode plates such that the bent positive electrode plate extensions are aligned with one another and arranging the negative electrode plates such that the bent negative electrode plate extensions are aligned with one another. The shape of the electrode plate extensions does not change following fusing to form current collectors.

Additionally, by reducing the amount of battery volume required for connection of electrode plates to terminals, the rechargeable prismatic battery of the present disclosure increased the amount of volume of the battery that is occupied by the electrode stack. Further, as the connection of positive current collectors to each other and to a terminal and of negative current collectors to each other and to a terminal requires a minimal amount of space, the rechargeable prismatic battery of the present disclosure allows for "flexible orientation". That is, the terminals of the battery can be located proximate to any surface of the electrode stack, as opposed to the need in conventional batteries for the terminals to located near the tabs of the electrode plates. In an embodiment, the connected positive current collectors and/or connected negative current collectors are insulated from the electrode stack.

Figure 9:
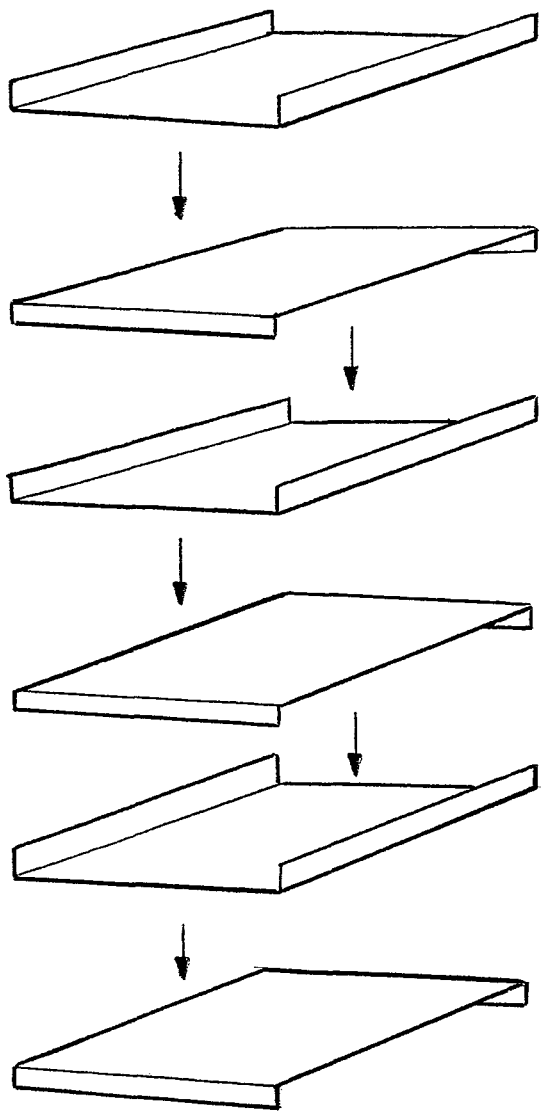
FIG. 9 depicts the assembly of positive electrode plates and negative electrode plates, according to an embodiment.

While FIGS. 2 and 8 illustrate assembly of an electrode stack such that both the positive and negative electrode extensions face the same direction (i.e., electrode stack surface), in an embodiment, the electrode plates can be assembled such that the positive electrode extensions face a different (e.g., opposite) direction (i.e., electrode stack surface) than the negative electrode extensions, as illustrated in FIG. 9. An advantage of such an electrode stack construction is allowance of ease of coupling of electrode stacks in series.

Figure 10:
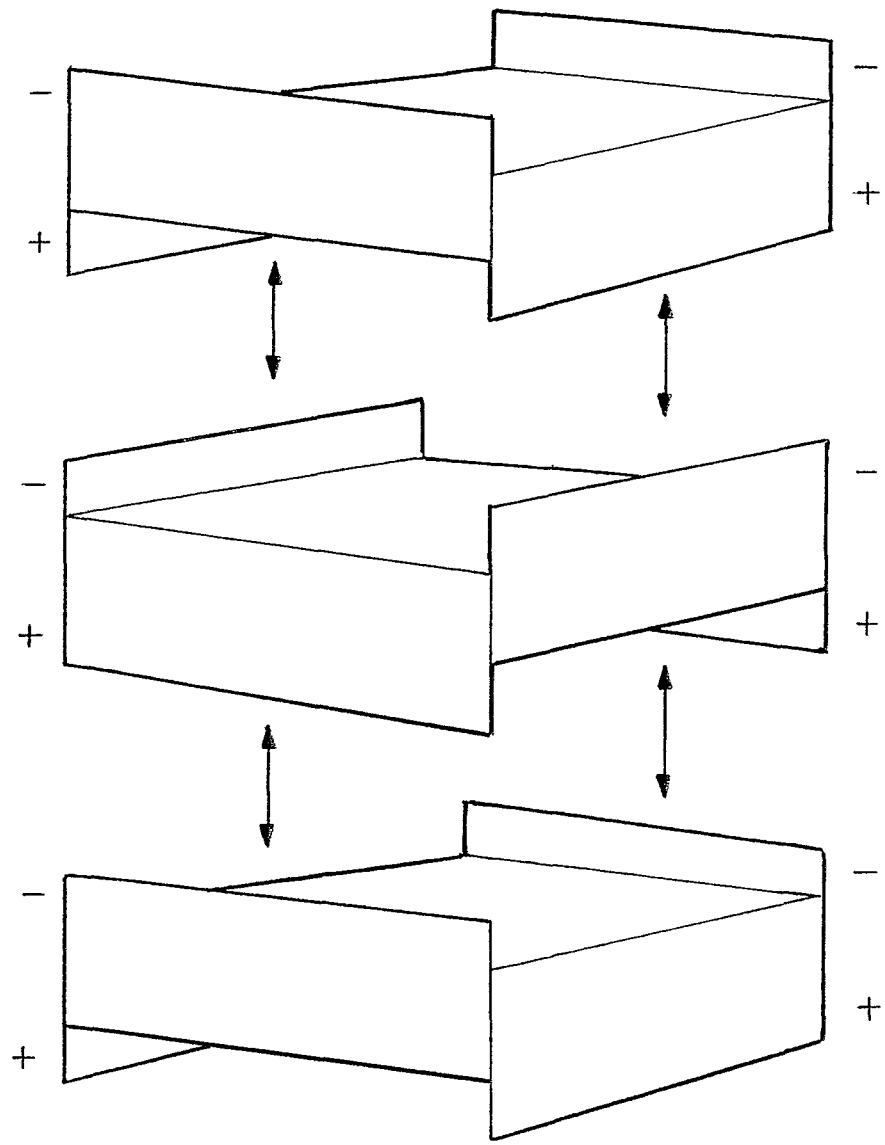
FIG. 10 depicts the assembly of a series of electrode stacks, as described herein.

For example, FIG. 10 illustrates how three such electrode stacks can be connected in series, such that the positive electrode extensions/current collectors of a first electrode stack can be fused (e.g., by welding, metalized spraying, etc.) to the negative electrode extensions/current collectors of a second electrode stack, and the positive electrode extensions/current collectors of a second electrode stack can be fused to the negative electrode extensions/current collectors of a third electrode stack (separator layers between the electrode stacks not shown). Accordingly, assuming the three electrode stacks are of the same construction, the voltage of the series of electrode stacks is three times that of the individual electrode stacks. The unique configuration of the electrode extensions/current collectors of the rechargeable prismatic battery of the present disclosure allows for the fusing of the negative electrode extensions/current collectors of an electrode stack to the positive electrode extensions/current collectors of another electrode stack. In comparison, conventional prismatic battery construction would not allow for fusing of the negative terminal of a battery to the positive terminal of another battery. Rather, with conventional prismatic battery construction, the negative terminal of a battery would have to be connected to the positive terminal of another battery by way of, for example, a connection plate or fitting. Such a connection plate or fitting would introduce a current restriction, thus creating resistance.

Assembly of positive (cathode) electrode plates and negative (anode) electrode plates can comprise stacking a cathode plate atop an anode plate, which is stacked atop another cathode plate, which is stacked atop another anode plate, etc. In the electrode stack, the alternating positive and negative electrode plates can be separated by separator layers, which insulate the electrode plates from one another. Alternatively, the flat plate electrodes can be wrapped and sealed in a layer of barrier and separator material to prevent short circuits and dendrite growth, as explained above. Cathode paste or anode paste, respectively, can be applied onto a portion of each of the electrode plates. With reference to a rechargeable flat plate electrode cell comprising compressed metal foam, each of the electrode plates can also have a portion which can be pressed (i.e., "coined") to create a thin, flat, high density area (e.g., about 0.15 inch wide), which can serve as electrode plate extensions.

Figure 11:
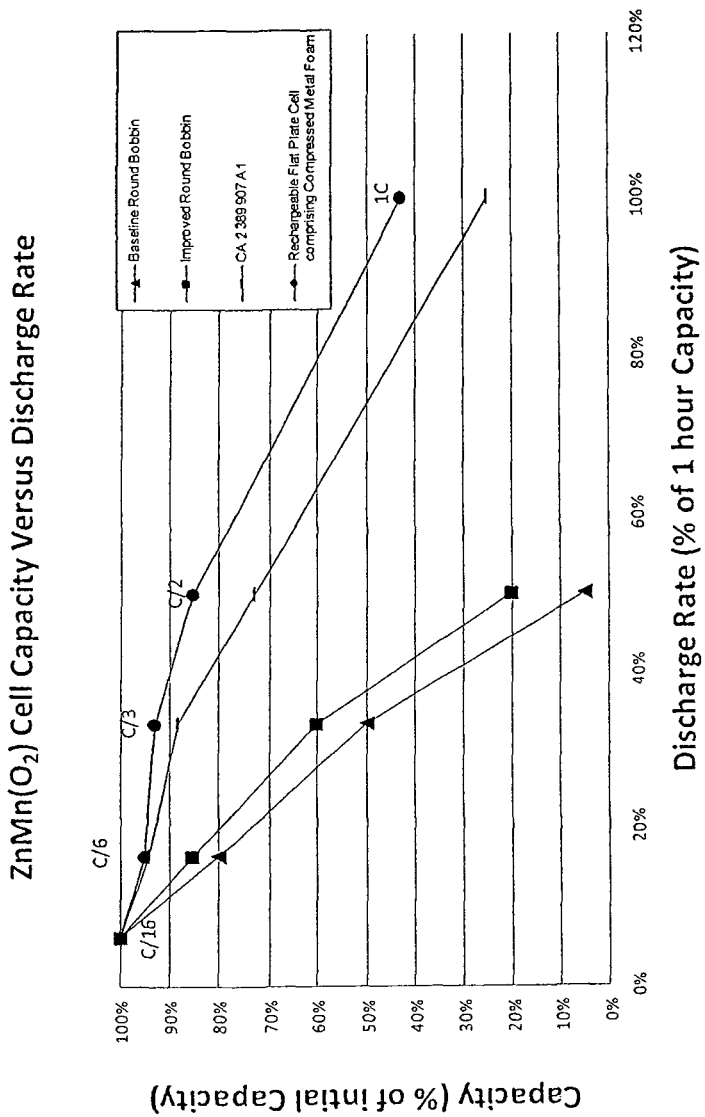
FIG. 11 shows the improvements of a rechargeable flat plate electrode cell comprising compressed metal foam over commercially available ZnMn round bobbin consumer cells in terms of Cell Capacity Versus Discharge Rate.
Figure 12:
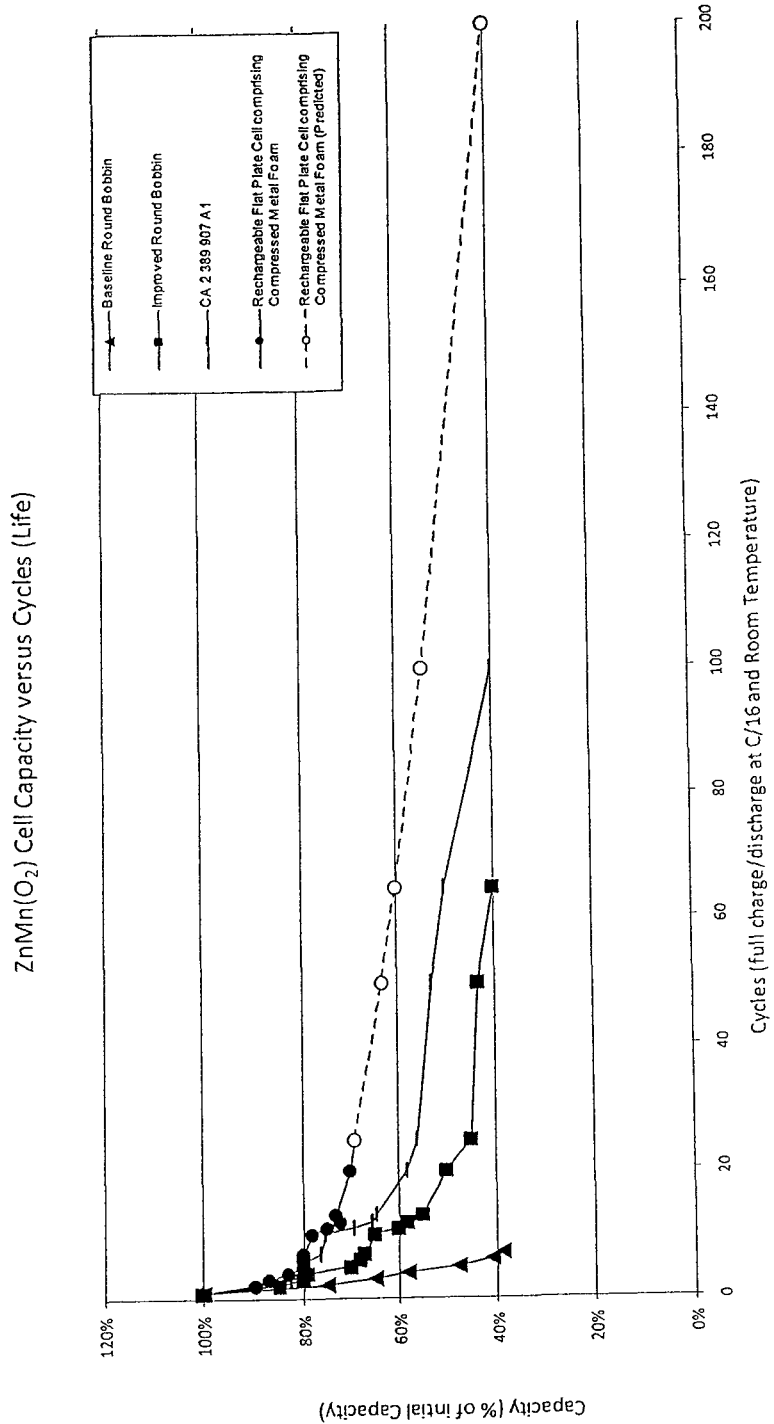
FIG. 12 shows the improvements of a rechargeable flat plate electrode cell comprising compressed metal foam over commercially available ZnMn round bobbin consumer cells in terms of Cell Capacity versus Cycles/Life.

As illustrated in FIGS. 11 and 12, a rechargeable flat plate electrode cell comprising compressed metal foam exhibits improved performance over commercially available ZnMn round bobbin consumer cells. In particular, FIG. 11 shows the improvements of a rechargeable flat plate electrode cell comprising compressed metal foam over commercially available ZnMn round bobbin consumer cells (i.e., "Baseline Round Bobbin" and "Improved Round Bobbin") as well as a cell as disclosed in CA 2 389 907 A1 in terms of Cell Capacity (expressed as a percentage of initial capacity) Versus Discharge Rate (expressed as a percentage of one hour capacity), while FIG. 12 shows the improvements of a rechargeable flat plate electrode cell comprising compressed metal foam over commercially available ZnMn round bobbin consumer cells (i.e., "Baseline Round Bobbin" and "Improved Round Bobbin") as well as a cell as disclosed in CA 2 389 907 A1 in terms of Cell Capacity (expressed as a percentage of initial capacity) versus Cycles/Life (expressed as full charge/discharge at C/16 and Room Temperature). As can be seen from FIG. 11, a rechargeable flat plate electrode cell comprising compressed metal foam has a capacity of greater than 50% of initial capacity, and in particular, a capacity of greater than 80% of initial capacity, at a discharge rate of greater than or equal to 50% of one hour capacity. As can be seen from FIG. 12, a rechargeable flat plate electrode cell comprising compressed metal foam has a capacity of greater than or equal to 60% of initial capacity at greater than or equal to 25 cycles at room temperature.

With further reference to FIG. 12, the Baseline Round Bobbin was tested for seven cycles, the Improved Round Bobbin was tested for sixty-five cycles, and a cell as disclosed in CA 2 389 907 A1 was tested for one hundred cycles. A rechargeable flat plate electrode cell comprising compressed metal foam was tested for twenty-five cycles, with predicted results shown for up to 200 cycles.

Additionally performance characteristics of a rechargeable flat plate electrode cell comprising compressed metal foam can include capacity of greater than 5 Ahr, cycle life exceeding 200 cycles at 80% DOD above 50% initial capacity, power exceeding C/2 rate to 1 V at 50% initial capacity and 2C rate to 1V at 25% initial capacity, energy density exceeding 90 Whr/kg, and power density exceeding 180 W/kg. DOD, or depth of discharge, is a measure of how much energy has been withdrawn from a battery, expressed as a percentage of full capacity. C/2 rate refers to a discharge rate of 50% of one hour capacity.

The rechargeable prismatic battery of the present disclosure comprising compressed metal foam as well as electrode plate extensions on multiple sides of electrode plate stacks can provide a capacity of greater than 50% of initial capacity, and in particular, a capacity of greater than 80% of initial capacity, at a discharge rate of greater than or equal to 50% of one hour capacity. The rechargeable prismatic battery of the present disclosure can provide a capacity of greater than or equal to 60% of initial capacity at greater than or equal to 25 cycles at room temperature. Additional performance characteristics of the rechargeable prismatic battery of the present disclosure can include capacity of greater than 5 Ahr, cycle life exceeding 200 cycles at 80% DOD above 50% initial capacity, power exceeding C/2 rate to 1 V at 50% initial capacity and 2C rate to 1V at 25% initial capacity, energy density exceeding 90 Whr/kg, and power density exceeding 180 W/kg. DOD, or depth of discharge, is a measure of how much energy has been withdrawn from a battery, expressed as a percentage of full capacity. C/2 rate refers to a discharge rate of 50% of one hour capacity.

The rechargeable prismatic battery of the present disclosure can also be utilized for other functions including, for example, in a vehicle for starting a internal combustion engine, as a bulk stationary battery used to store generated electricity from generators (such as, for example, internal combustion, solar, wind tide, hydro-electric, nuclear, geothermal, etc.), as an uninterruptible power supply (UPS) battery (to be used, for example, in facility/factory back-up, equipment, home, office, etc.), and in a more portable format can be used in power tools, cell phones, laptop computers, and portable electronic devices. In particular, the rechargeable prismatic battery of the present disclosure allows for faster charging, making it more convenient for portable applications, and less gassing, making it safer for personal use. A portable rechargeable prismatic battery comprising a $Mn(O_2)$ positive electrode and a Zn negative electrode would provide advantages such as, for example, having longer charge retention than other rechargeable chemistries commercially available (e.g., NiMH, LiIon, NiCd, Lead Acid, Li Polymer), be lighter and smaller than Ni based batteries, and be safer than Li based batteries.

The following illustrative examples are intended to be non-limiting.

EXAMPLES

With regard to formation of the flat plate anode electrodes, 360 grams of Zn, 72 grams of ZnO, and 59.88 grams of 2% CMC gel were mixed to form a paste comprising 83.1 weight % zinc active material (i.e., Zn), 16.6 weight % solid zinc oxide, and 0.27 weight % polymeric binder. The paste was applied to one side of copper plated nickel foam and pressed/worked in. The copper was plated on the nickel foam via copper plating 1A for 30 minutes. Water was evaporated from the paste, and the dried pasted foam was pressed to approximately 50% of its original thickness. Further details of formed flat plate anode electrodes can be found in Table 1, below. With regard to the capacity calculations in Table 1, the capacity of 0.625 g Zn is 512 mAh. An edge section of each of the anode electrode plates can be pressed to create a thin, flat, high density area, which can serve as the anode electrode plate extension used to form a negative current collector.

With regard to formation of the flat plate cathode electrodes, 41.90 grams of 2% CMC gel and 100 grams of cathode powder ground down to $\frac{1}{10}^{th}$ of the initial particle size were mixed to form a paste. The cathode powder comprised electrolytic manganese dioxide, 7.5 weight % graphite/carbon black, 5 weight % polymeric binding agent, 5 weight % barium compound, and 5 weight % hydrogen recombination catalyst, and is pressed to form high density initial particles. The 2% CMC gel provided an additional 1 weight % polymeric binding agent to provide a paste with a total of 6 weight % polymeric binding agent. The paste was applied to one side of nickel foam having a weight basis of 0.255 g/in². Water was evaporated from the paste, and the dried pasted foam was pressed to approximately 50% of its original thickness. Further details of formed flat plate cathode electrodes can be found in Table 2, below. An edge section of each of the cathode electrode plates can be pressed to create a thin, flat, high density area, which can serve as the cathode electrode plate extension used to form a positive current collector.

Many modifications of the exemplary embodiments disclosed herein will readily occur to those of skill in the art. Accordingly, the rechargeable prismatic battery of the present disclosure is to be construed as including all structure and methods that fall within the scope of the appended claims.

What is claimed is:

1. A rechargeable prismatic battery comprising:
an electrode stack comprised of positive electrode plates and negative electrode plates, wherein:
the positive electrode plates each comprise:
manganese dispersed throughout a compressed metal foam comprising a polymer binder; and
with the positive electrode plates extending beyond a periphery of the electrode stack, and with the positive electrode plates arranged such that the positive electrode plates are aligned with one another and are fused; and
the negative electrode plates each comprise:
zinc dispersed throughout a compressed metal foam comprising a polymer binder; and
with the negative electrode plates extending beyond a periphery of the electrode stack, and with the nega-

TABLE 1

Anode Design

| Substrate | Weight (g) | Width (in) | Length (in) | Paste Weight (g) | Sized Width (in) | Sized Length (in) | Sized Thickness (Substrate and Paste) (in) | Paste Weight/ Sized Area (g/in²) | $A \cdot h/in^2$ | $A \cdot h/in^3$ |
|---|---|---|---|---|---|---|---|---|---|---|
| 1 | 2.669 | 2.52 | 2.37 | 13.098 | 2.54 | 2.50 | 0.0370 | 2.063 | 1.406 | 37.988 |
| 2 | 2.697 | 2.52 | 2.37 | 13.258 | 2.54 | 2.52 | 0.0370 | 2.071 | 1.411 | 38.147 |
| 3 | 2.634 | 2.53 | 2.38 | 15.061 | 2.54 | 2.53 | 0.0380 | 2.344 | 1.597 | 42.027 |
| 4 | 2.679 | 2.52 | 2.35 | 13.833 | 2.53 | 2.47 | 0.0370 | 2.214 | 1.508 | 40.767 |
| 5 | 2.631 | 2.53 | 2.38 | 15.144 | 2.55 | 2.55 | 0.0380 | 2.329 | 1.587 | 41.763 |
| 6 | 2.699 | 2.50 | 2.39 | 14.534 | 2.53 | 2.50 | 0.0370 | 2.298 | 1.566 | 42.319 |
| 7 | 2.375 | 2.54 | 2.36 | 15.238 | 2.56 | 2.49 | 0.0380 | 2.390 | 1.629 | 42.867 |
| 8 | 2.360 | 2.54 | 2.36 | 14.495 | 2.55 | 2.48 | 0.0370 | 2.292 | 1.562 | 42.212 |
| 9 | 2.339 | 2.52 | 2.38 | 15.492 | 2.55 | 2.48 | 0.0380 | 2.450 | 1.669 | 43.929 |
| 10 | 2.308 | 2.53 | 2.38 | 16.602 | 2.55 | 2.50 | 0.0390 | 2.604 | 1.775 | 45.502 |
| 11 | 2.618 | 2.53 | 2.37 | 14.380 | 2.54 | 2.51 | 0.0360 | 2.256 | 1.537 | 42.694 |

TABLE 2

Cathode Design

| Substrate | Weight (g) | Width (in) | Length (in) | Thickness (in) | Coated Length (in) | Paste Weight (g) | Sized Width (in) | Sized Length (in) | Sized Coated Length (in) | Sized Thickness (Substrate and Paste) (in) | Paste Weight/ Sized Coated Area (g/in²) | mAh/in² |
|---|---|---|---|---|---|---|---|---|---|---|---|---|
| 1 | 1.168 | 2.53 | 1.81 | 0.058 | 1.54 | 4.492 | 2.57 | 2.02 | 1.77 | 0.0250 | 0.988 | 216 |
| 2 | 1.170 | 2.52 | 1.82 | 0.054 | 1.56 | 4.129 | 2.57 | 1.97 | 1.72 | 0.0235 | 0.934 | 205 |
| 3 | 1.141 | 2.50 | 1.79 | 0.050 | 1.56 | 3.555 | 2.52 | 1.90 | 1.66 | 0.0225 | 0.850 | 186 |
| 4 | 1.149 | 2.49 | 1.81 | 0.049 | 1.57 | 3.577 | 2.54 | 1.94 | 1.69 | 0.0230 | 0.833 | 182 |
| 5 | 1.143 | 2.49 | 1.80 | 0.048 | 1.58 | 3.756 | 2.54 | 1.94 | 1.72 | 0.0230 | 0.860 | 188 |
| 6 | 1.138 | 2.48 | 1.80 | 0.050 | 1.58 | 3.815 | 2.53 | 1.94 | 1.72 | 0.0235 | 0.877 | 192 |
| 7 | 1.139 | 2.51 | 1.78 | 0.052 | 1.55 | 4.328 | 2.56 | 1.96 | 1.75 | 0.0235 | 0.966 | 212 |
| 8 | 1.154 | 2.50 | 1.81 | 0.050 | 1.56 | 4.067 | 2.56 | 1.96 | 1.69 | 0.0235 | 0.940 | 206 |
| 9 | 1.152 | 2.51 | 1.80 | 0.050 | 1.58 | 4.041 | 2.56 | 1.94 | 1.74 | 0.0230 | 0.907 | 199 | tive electrode plates arranged such that the negative electrode plates are aligned with one another and are fused, and with both the positive electrode plates and the negative electrode plates compressed between about 42 and 45% of the original thickness.

2. The rechargeable prismatic battery of claim 1, wherein the fused positive electrode plates are connected to a positive terminal.

3. The rechargeable prismatic battery of claim 1, wherein the fused negative electrode plates are connected to a negative terminal.

4. The rechargeable prismatic battery of claim 1, wherein the periphery of the electrode stack of positive electrode plates comprises a finite number of sides, and further wherein the positive electrode plates are fused to form positive current collectors at multiple sides of the electrode stack.

5. The rechargeable prismatic battery of claim 4, wherein the positive current collectors are coextensive with the sides of the electrode stack.

6. The rechargeable prismatic battery of claim 1, wherein the periphery of the electrode stack of negative electrode plates comprises a finite number of sides, and further wherein the negative electrode plates are fused to form negative current collectors at multiple sides of the electrode stack.

7. The rechargeable prismatic battery of claim 6, wherein the positive current collectors are coextensive with the sides of the electrode stack.

8. The rechargeable prismatic battery of claim 1, wherein the periphery of the electrode stack of positive electrode plates comprises an even number of sides, and further wherein the positive electrode plates are fused to form positive current collectors at alternating sides of the electrode stack.

9. The rechargeable prismatic battery of claim 1, wherein the periphery of the electrode stack of negative electrode plates comprises an even number of sides, and further wherein the negative electrode plates are fused to form negative current collectors at alternating sides of the electrode stack.

10. The rechargeable prismatic battery of claim 1, wherein all of the positive electrode plates are of the same shape, and all of the negative electrode plates are of the same shape.

11. The rechargeable prismatic battery of claim 1, wherein all of the positive electrode plate extensions and all of the negative electrode plates are bent at the same angle.

12. The rechargeable prismatic battery of claim 1, wherein carboxy methylcellulose is contained in the compressed metal foam as a polymeric binder.

13. A prismatic battery comprising:

an electrode stack comprised of positive electrode plates, negative electrode plates, and separator layers therebetween, wherein:

the positive electrode plates extend beyond a periphery of the electrode stack, and the positive electrode plates are arranged such that the positive electrode plates are aligned with one another and are fused together to create a positive current collector, with the positive electrode plates comprising manganese dispersed throughout a compressed metal foam which is compressed between 42 and 45% of the original thickness; and the negative electrode plates extend beyond a periphery of the electrode stack, and the negative electrode plates are arranged such that the negative electrode plates are aligned with one another and are fused together to create a negative current collector, with the negative electrode plates comprising zinc dispersed throughout a compressed metal foam which is compressed between about 42 and 45% of the original thickness.

14. The prismatic battery of claim 13, wherein the positive current collector is connected to a positive terminal.

15. The prismatic battery of claim 13, wherein the negative current collector is connected to a negative terminal.

16. The prismatic battery of claim 13, wherein the periphery of the electrode stack of positive electrode plates comprises a finite number of sides, and further wherein the positive electrode plates are fused to form positive current collectors at multiple sides of the electrode stack.

17. The prismatic battery of claim 16, wherein the positive current collectors are coextensive with the sides of the electrode stack.

18. The prismatic battery of claim 13, wherein the periphery of the electrode stack of negative electrode plates comprises a finite number of sides, and further wherein the negative electrode plates are fused to form negative current collectors at multiple sides of the electrode stack.

19. The prismatic battery of claim 18, wherein the positive current collectors are coextensive with the sides of the electrode stack.

20. The prismatic battery of claim 13, wherein the periphery of the electrode stack of positive electrode plates comprises an even number of sides, and further wherein the positive electrode plates are fused to form positive current collectors at alternating sides of the electrode stack.

21. The prismatic battery of claim 13, wherein the periphery of the electrode stack of negative electrode plates comprises an even number of sides, and further wherein the negative electrode plates are fused to form negative current collectors at alternating sides of the electrode stack.

22. The prismatic battery of claim 13, wherein all of the positive electrode plates are of the same shape, and all of the negative electrode plates are of the same shape.

23. The prismatic battery of claim 13, wherein all of the positive electrode plates and all of the negative electrode plates are bent at the same angle.

* * * * *